US007019282B2

(12) United States Patent
Atsuta et al.

(10) Patent No.: US 7,019,282 B2
(45) Date of Patent: Mar. 28, 2006

(54) OPTICAL ENCODER

(75) Inventors: Akio Atsuta, Kanagawa (JP); Masahiko Igaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/863,886

(22) Filed: Jun. 8, 2004

(65) Prior Publication Data

US 2004/0262505 A1 Dec. 30, 2004

(30) Foreign Application Priority Data

Jun. 30, 2003 (JP) .............................. 2003-188867

(51) Int. Cl.
*G01B 11/02* (2006.01)

(52) U.S. Cl. .................................................. 250/231.16

(58) Field of Classification Search ............................... 250/231.13–231.19
See application file for complete search history.

(56) References Cited

U.S. PATENT DOCUMENTS 5,347,355 A * 9/1994 Eguchi ........................ 356/494
2002/0122186 A1 9/2002 Igaki

* cited by examiner

*Primary Examiner*—Thanh X. Luu
*Assistant Examiner*—Tony Ko
(74) *Attorney, Agent, or Firm*—Canon U.S.A. Inc. I.P.Div

(57) ABSTRACT

An optical encoder includes a scale having an optical grating formed thereon, a plurality of light-receiving devices, a light-emitting device, and a position-information detecting unit. The plurality of light-receiving devices is movable with respect to the scale. The light-emitting device applies light to the plurality of light-receiving devices through the scale. A position-information detecting unit detects position information in one cycle of a two-phase signal supplied from the light-receiving device. A determining unit determines an amplitude of an analog signal based on the position information.

14 Claims, 12 Drawing Sheets

OPTICAL ENCODER

BACKGROUND OF THE INVENTION

1. Field of the Invention

The present invention relates to an optical encoder capable of providing a stable-amplitude signal.

2. Description of the Related Art

A photoelectric encoder basically has a main scale having a first optical grating formed thereon, an index scale opposing the main scale and having a second optical grating formed thereon, a light-emitting device for emitting light to the main scale, and a light-receiving device for receiving the light that is transmitted through or reflected from the optical grating of the main scale and then is transmitted through the optical grating of the index scale. Photoelectric encoders that use arrays of light-receiving devices serving as the index scales have already been proposed.

FIG. 10 is a diagram schematically showing a known photoelectric encoder. FIG. 11 is a cross-sectional view of a light-detecting-side grating substrate of the known photoelectric encoder. Referring to FIGS. 10 and 11, light-receiving portions 258 are formed in stripes at a predetermined pitch on a light-detecting-side grating substrate 232. Each light-receiving portion 258 includes a first conductive signal layer 252, a PN semiconductor layer 254, and a second conductive signal layer 256 layered on a light-transmissive base material 250. The first conductive signal layer 252 is made of a light-blocking and conductive material, such as a metallic film. At the PN semiconductor layer 254, light rays are converted into electrical signals. The second conductive signal layer 256 is made of a light-transmissive and conductive material, such as $In_2O_3$, $SnO_2$, Si, or a mixture thereof. The light-transmissive base material 250 is made of, for example, glass. The light-receiving portions 258 oppose a main scale 224. The light-receiving portions 258 provide slits.

The light rays transmitted through the second conductive signal layer 256 in the light-receiving portion 258 are incident on the PN semiconductor layer 254. The light rays are photoelectrically converted at the boundary surface between an N-type amorphous silicon film 260 and a P-type amorphous silicon film 262. The photoelectrically-converted light rays are output from the light-detecting-side grating substrate 232 via output terminals 264 and 266.

A light-emitting-side grating substrate 230 is integrally formed with light-emitting devices 212, and the light-detecting-side grating substrate 232 is integrally formed with the light-receiving portions 258. This allows for a photoelectric encoder that has a reduced number of parts and, therefore, is compact and light-weight.

FIG. 12 illustrates a relationship between an example pattern of a photodiode array used in the photoelectric encoder shown in FIGS. 10 and 11 and a contrast pattern of the detected light. Referring to FIG. 12, photodiode groups S1 to S4 are arranged out of phase with the contrast pattern by 0°, 90°, 180°, and 270°, respectively. FIG. 13 is a block diagram of a signal processing circuit for the signals from the photodiode groups S1 to S4 in FIG. 12.

The photodiode groups S1 to S4 supply signals to current-to-voltage converters 300*a* to 300*d* for converting a current into a voltage. The signals converted by the current-to-voltage converters 300*a* to 300*d* are out of phase with the contrast pattern by 0°, 90°, 180°, and 270°. Differentially amplifying the signals from the photodiode groups S1 and S3 via a differential amplifier 301*a* provides an analog sinusoidal voltage signal A that is out of phase with the contrast pattern by 0°, and differentially amplifying the signals from the photodiode groups S2 and S4 via a differential amplifier 301*b* provides an analog sinusoidal voltage signal B that is out of phase with the contrast pattern by 90°.

Actual encoders use the analog sinusoidal voltage signals A and B without conversion, or use digital signals converted from the analog sinusoidal voltage signals A and B and supplied to processing circuits, such as counter circuits, through comparators.

However, in such a photoelectric encoder, a variation in the light-emitting device or the light-receiving device, the positional relation between the scale and the optical system, or an optical variation causes the amplitude of the output from the encoder to be unstable while the scale is operating or owing to deterioration with age.

In order to solve the problem, measures are taken in which the maximum and minimum values of the sinusoidal signal output from the encoder are detected by moving a movable body, the amplitude is calculated from the difference between the maximum value and the minimum value, and the amplitude is adjusted by using a resistor or the like so as to set the amplitude to a reference level.

However, there is a problem with such measures in that the amplitude cannot be detected unless the movable body moves by one pitch, that is, by one cycle of the sinusoidal signal.

Although there is a method of calculating the amplitude from the sum of squares of the analog sinusoidal voltage signals A and B, this calculation is complicated and the circuit size is increased if an analog circuit is used. In addition, it can take a long time to perform arithmetic processing, thus possibly causing a delay in the detection result when the amplitude varies greatly.

SUMMARY OF THE INVENTION

The present invention is directed to an optical encoder capable of detecting amplitude of an analog signal at intervals shorter than those with known optical encoders. The present invention is also directed to a control method of thereof. The optical encoder includes a light-receiving device including a plurality of light-receiving portions, wherein the light-receiving device supplies a two-phase signal and an analog signal; a scale including an optical grating formed thereon, wherein the scale is movable relative to the light-receiving device; and a light-emitting device applying light to the plurality of light-receiving portions via the scale.

In one aspect of the present invention, the optical encoder includes a detecting unit capable of detecting position information in one cycle of the two-phase signal. In other words, the optical encoder is capable of determining, based on a division result of the analog sinusoidal signal or the like, where in one cycle of a sinusoidal signal the position information is located.

In another aspect of the present invention, the optical encoder includes a determining unit capable of determining an amplitude of the analog signal based on the position information. In one embodiment, the optical encoder is capable of calculating amplitude of the analog signal by detecting two-phase analog signals and performing an arithmetic operation. In another embodiment, using the division result of the two-phase analog signal or detecting the analog signals at points where the division result of the two-phase analog signal is known enables the detection of the amplitude of the analog signal at intervals shorter than those with known optical encoders.

Further features and advantages of the present invention will become apparent from the following description of the embodiments with reference to the attached drawings.

DESCRIPTION OF THE PREFERRED EMBODIMENTS

The present invention will be described in detail below with reference to the attached drawings.

Figure 1:
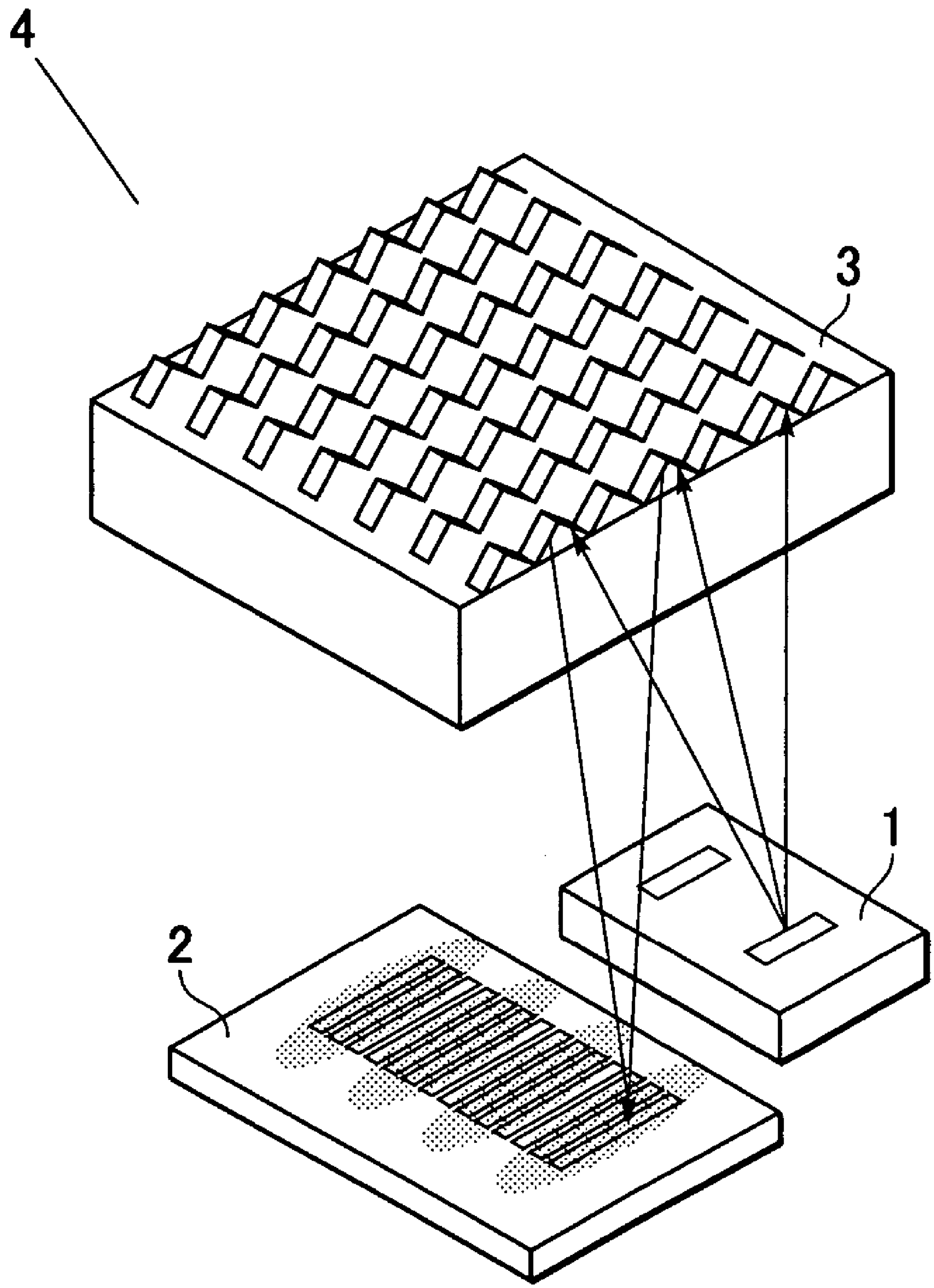
FIG. 1 is a perspective view schematically showing the structure of an optical encoder of the present invention.

FIG. 1 is a perspective view of an optical encoder 4 according to one embodiment of the present invention. The optical encoder 4 can be a reflective optical encoder. In addition, a micro roof-mirror lens array is used in a scale as an optical grating in order to improve the utilization ratio of light. The optical grating has a pitch. A structure using the micro roof-mirror lens array is disclosed in Japanese Patent Laid-Open No. 2002-323347.

Figure 10:
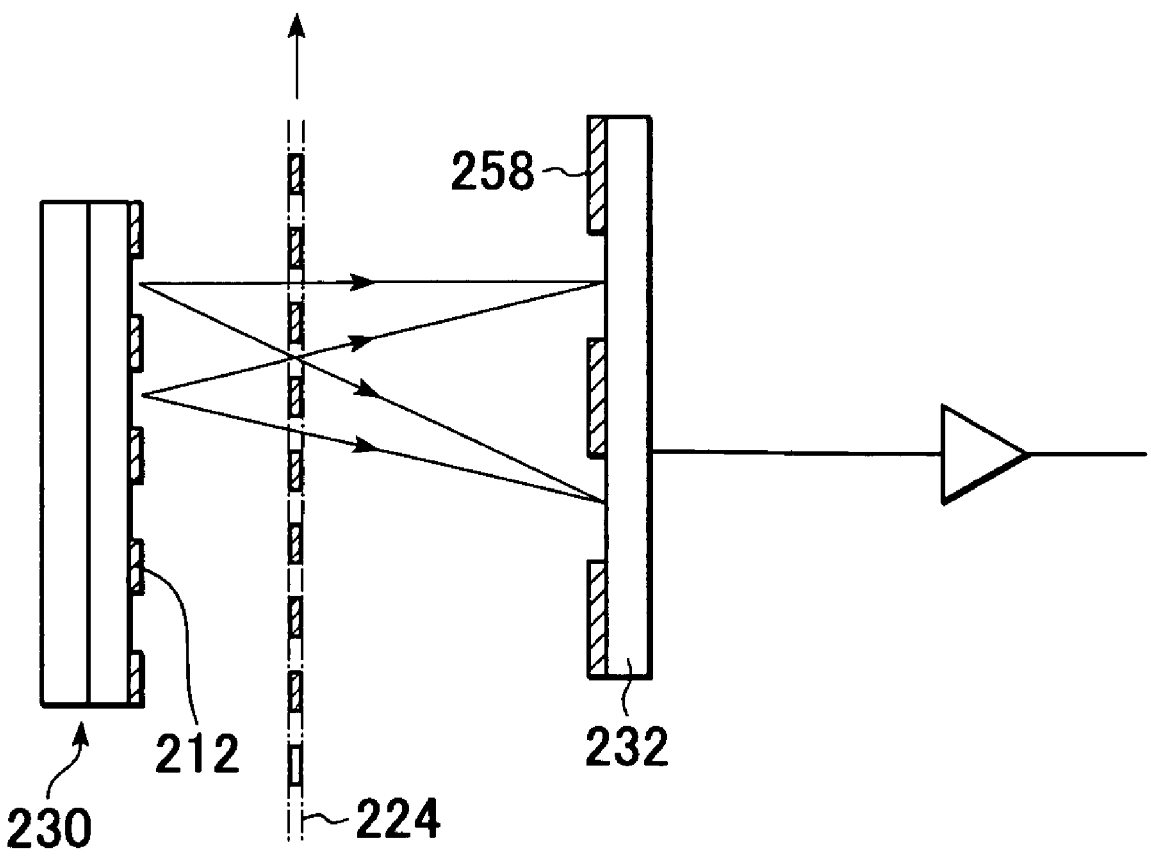
FIG. 10 is a diagram schematically showing the structure of a known photoelectric encoder.
Figure 11:
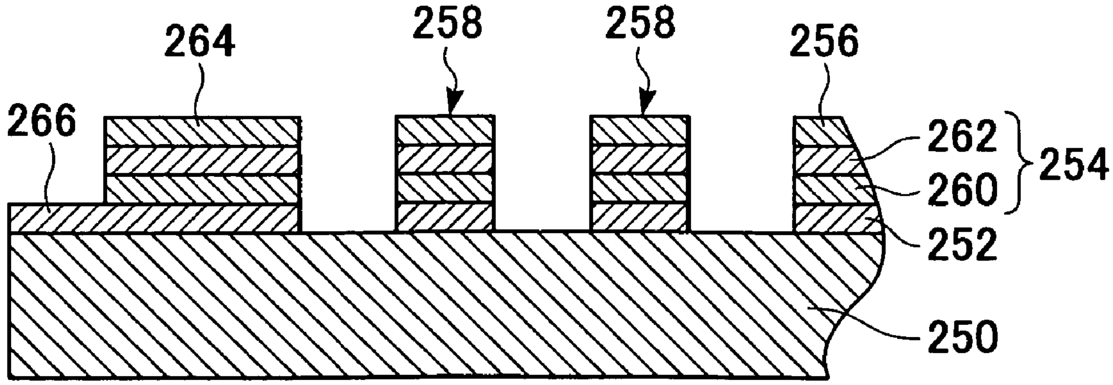
FIG. 11 is a cross-sectional view showing the structure of a light-detecting-side grating substrate in the known photoelectric encoder.

The reflective optical encoder 4 includes a light-emitting device 1, such as a light emitting diode (LED), emitting light onto a movable body 3. The movable body 3 has reflective parts and non-reflective parts, which are formed of the micro roof-mirror lens array and are arranged at short intervals. The light from the light emitting device 1 is reflected from the movable body 3 and is received by a light-receiving device 2 having the structure shown in FIG. 10 to exhibit contrast distribution on the rows of the light-receiving device 2. The light receiving portions of the light-receiving device 2 are arranged in association with the pitch of the optical grating of the movable body 3.

The optical encoder 4 of the present invention is not limited to the movable body having the micro roof-mirror lens array. Alternatively, the movable body can simply have the reflective parts and the non-reflective parts, which can produce a similar contrast distribution of light on the light-receiving device 2 for generating encoder signals. However, there is a difference in the signal level.

Figure 2:
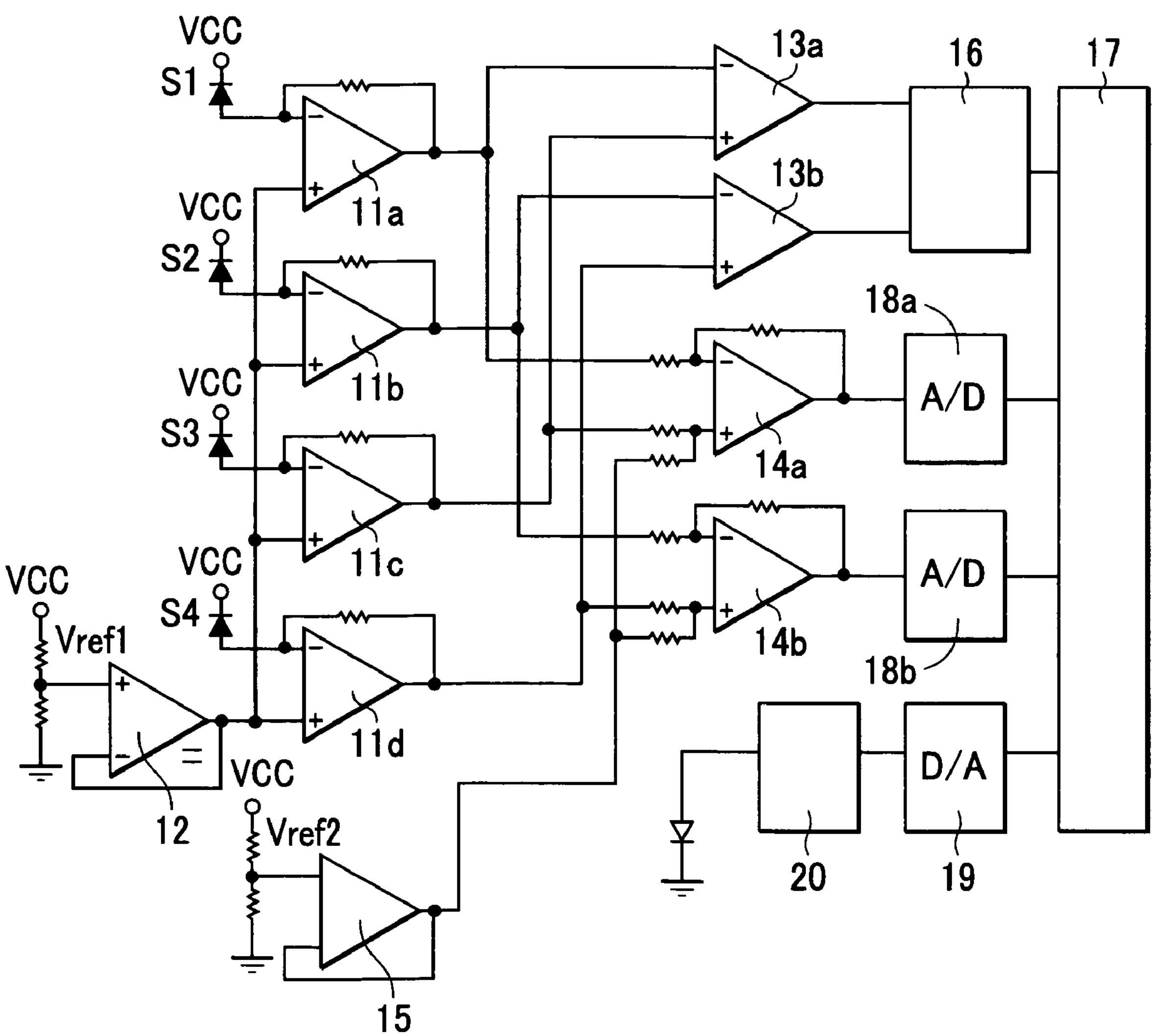
FIG. 2 is a block diagram showing the structure of a signal processing circuit according to a first embodiment of the present invention.
Figure 12:
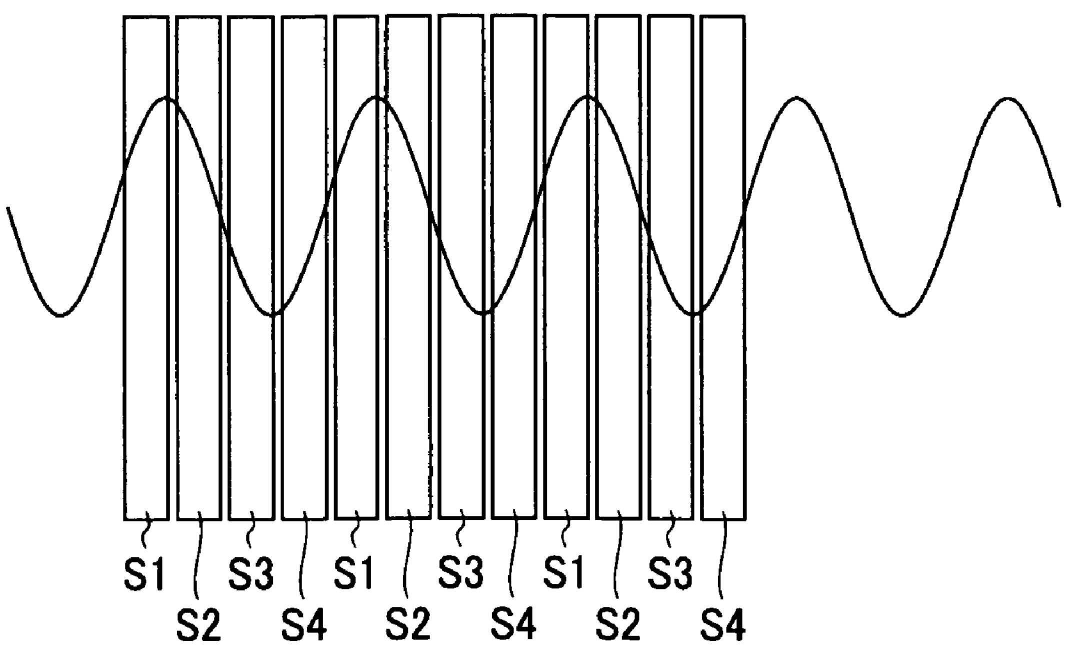
FIG. 12 illustrates the relationship between an example pattern of a photodiode array and a contrast pattern of the detected light.
Figure 13:
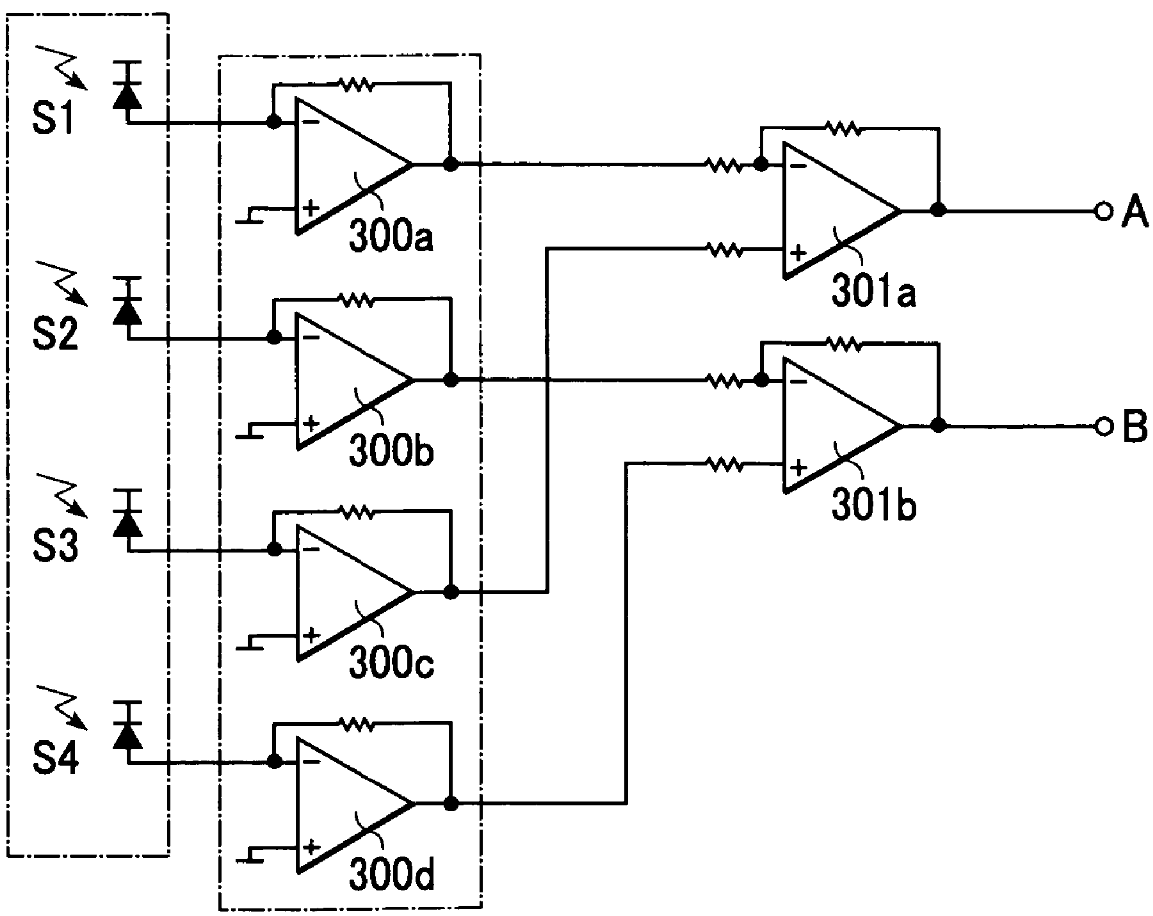
FIG. 13 is a block diagram showing the structure of a signal processing circuit for the signals provided by the known optical encoder.

FIG. 2 is a block diagram showing a signal processing circuit according to a first embodiment of the present invention. Analog signals from the photodiode groups S1 to S4, as shown in FIG. 12, are supplied to current-voltage converters 11*a* to 11*d*, respectively. Outputs from a reference-voltage generator 12 are supplied to all the current-voltage converters 11*a* to 11*d*. The output from the current-voltage converter 11*a* is supplied to the negative (−) terminal of a comparator 13*a* and to the negative terminal of a differential amplifier 14*a*. The output from the current-voltage converters 11*b* is supplied to the negative terminal of a comparator 13*b* and to the negative terminal of a differential amplifier 14*b*. The output from the current-voltage converter 11*c* is supplied to the positive (+) terminal of the comparator 13*a* and to the positive terminal of the differential amplifier 14*a*. The output from the current-voltage converter 11*d* is supplied to the positive terminal of the comparator 13*b* and to the positive terminal of the differential amplifier 14*b*. The output from a buffer amplifier 15 is supplied to the differential amplifiers 14*a* and 14*b* as an offset voltage such that the analog signals output from the differential amplifiers 14*a* and 14*b* are used with a single power supply.

The outputs from the comparators 13*a* and 13*b* are supplied to a CPU 17, such as a microcomputer, through a counter circuit 16. The outputs from the differential amplifiers 14*a* and 14*b* are supplied to the CPU 17 through analog-to-digital converters 18*a* and 18*b*, respectively. The output from the CPU 17 is supplied through a digital-to-analog converter 19 to a light-emission-amount controlling circuit 20 for changing the amount of light emitted from the light-emitting device 1.

Figure 3:
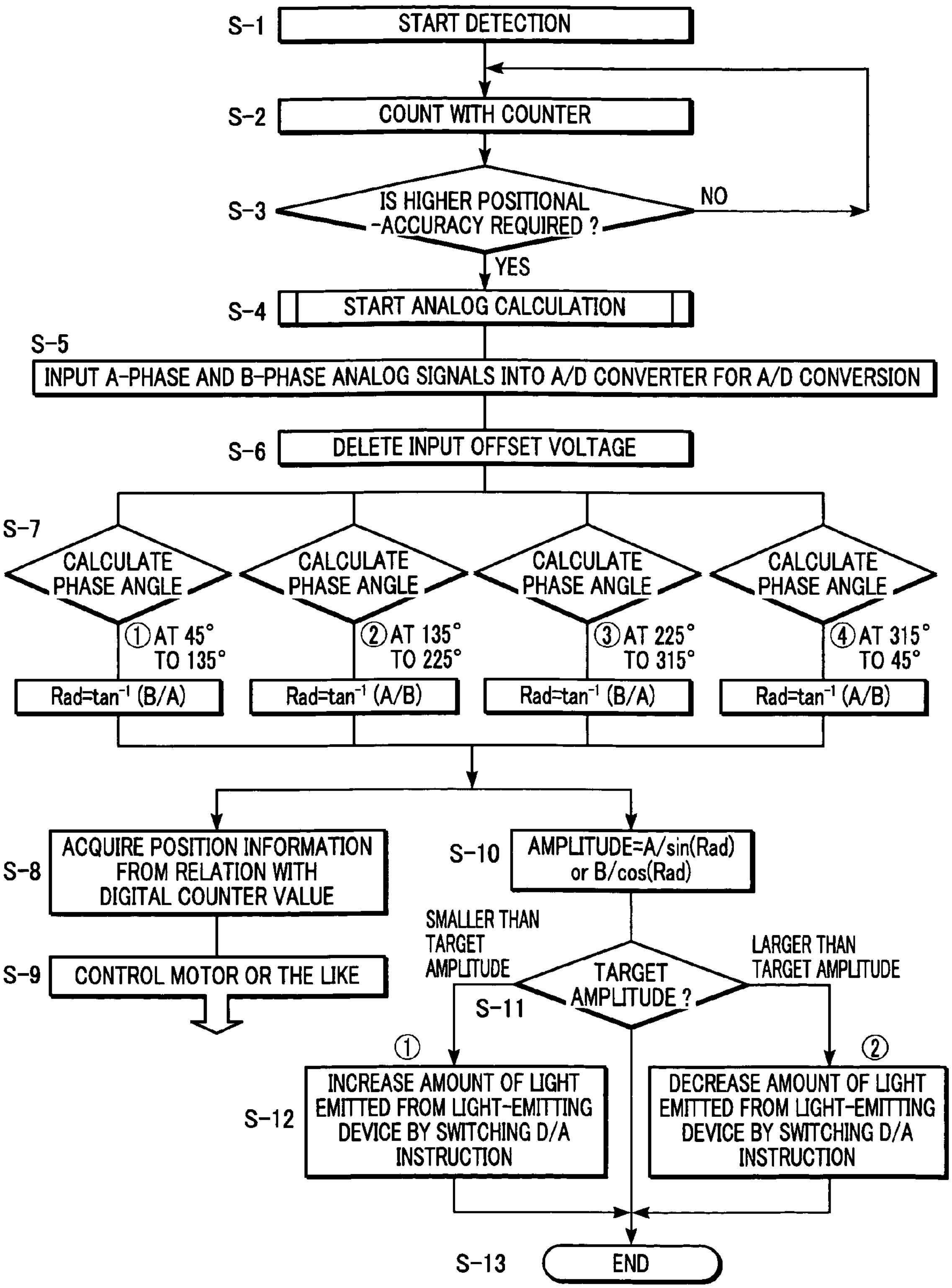
FIG. 3 is a flowchart showing a process of detecting an amplitude in the signal processing circuit in FIG. 2.
Figure 4A:
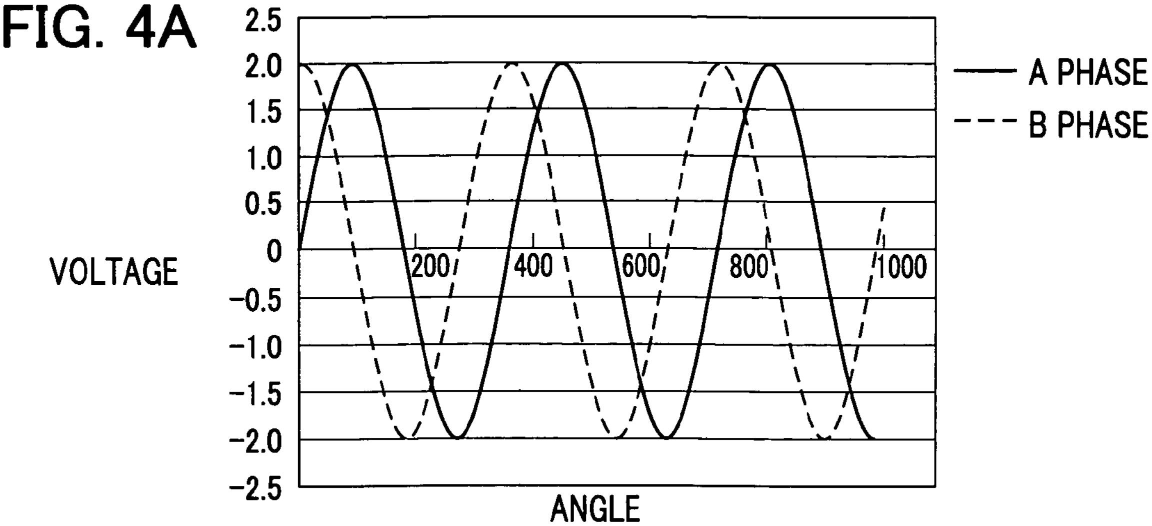
FIGS. 4A to 4C illustrate the result of arithmetic processing of signals in the flowchart in FIG. 3.
Figure 4B:
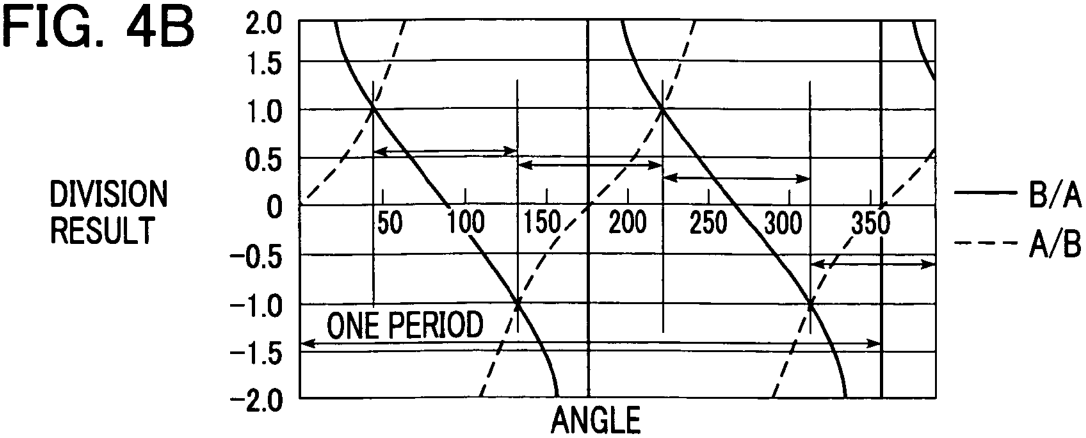
Figure 4C:
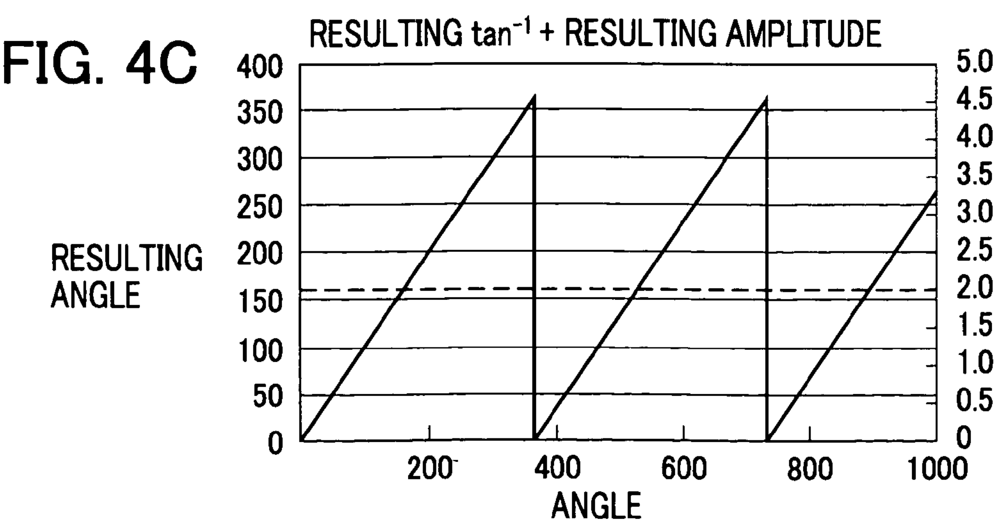

FIG. 3 is a flowchart of a process in the signal processing circuit shown in FIG. 2. Two operations are performed; a high-precision detecting operation for detecting position based on a $\tan^{-1}$ calculation after the analog signals are converted into digital signals by the analog-to-digital converters 18*a* and 18*b*, and an amount-of-light feedback operation based on amplitude for acquiring an amplitude from the detected angle information to control the amount of light emitted from the light-emitting device 1.

The operation of the signal processing circuit of the first embodiment will now be described with reference to the flowchart in FIG. 3 and FIGS. 4A to 4C. In Step S-1, the process starts detecting position information. Since it is not necessary to detect detailed position information during an ordinary high-speed operation or when the optical encoder 4 is started up, in Step S-2, the process counts only digital signals. The light-emitting device 1 emits a predetermined amount of light here.

In Step S-3, the process determines whether a higher positional-accuracy is required. At this time, the signals from the photodiode groups S1 to S4 are converted into analog voltage signals in the current-voltage converters 11*a* to 11*d*, respectively. An A-phase signal (S1–S3) and a B-phase signal (S2–S4) are generated in the comparators 13*a* and 13*b*, respectively, from the analog voltage signals. The A-phase signal (S1–S3) and the B-phase signal (S2–S4) are supplied to the counter circuit 16 as digital signals. If a higher positional-accuracy is not required in Step S-3, the signal processing circuit returns to Step S-2 to continue counting only the digital signals because the measurement of the analog signals is not required. If a higher positional-accuracy is required in Step S-3, then in Steps S-4 and S-5, the signals are supplied from the current-voltage converters 11_a_ to 11_d_ to the differential amplifiers 14_a_ and 14_b_, and the A-phase analog signal (S1–S3) and the B-phase analog signal (S2–S4) generated in the differential amplifiers 14_a_ and 14_b_ are supplied to the analog-to-digital converters 18_a_ and 18_b_, respectively, and are converted into digital values. In Step S-6, the process eliminates an offset voltage supplied from the buffer amplifier 15 from the analog signals to facilitate the operation of the analog signals.

The outputs from the counter circuit 16 and the analog-to-digital converters 18_a_ and 18_b_ are supplied to the CPU 17. In Step S-7, the process determines the phase angle with the CPU 17. That is, it determines which area among the four areas in one cycle the position information is in, based on the relation of the A-phase signal (S1–S3) to the B-phase signal (S2–S4) and the signs of the A-phase signal (S1–S3) and the B-phase signal (S2–S4) shown in FIG. 4A. The process then acquires the detailed position information within one cycle from the division of the A-phase signal (S1–S3) by the B-phase signal (S2–S4) and the division of the B-phase signal (S2–S4) by the A-phase signal (S1–S3) shown in FIG. 4B and the $\tan^{-1}$ calculation shown in FIG. 4C. In Step S-8, the process acquires the detailed position information from the relation with digital counter values in a motor-controlling routine. In Step S-9, the process drives and controls an actuator such as a motor.

In Step S-10, the process calculates the amplitude of the A-phase signal (S1–S3) or the B-phase signal (S2–S4) from the position information obtained in the other routine. Then, the process compares the calculated amplitude with the unit amplitude 1 to obtain an actual amplitude. In Step S-11, the process compares the obtained actual amplitude with a predetermined target amplitude. In Step S-12, the amount of light emitted from the light-emitting device 1 is increased if the actual amplitude is lower than the target amplitude, and the amount of light emitted from the light-emitting device 1 is decreased if the actual amplitude is higher than the target amplitude. In Step S-13, the process is completed, and it has become possible to maintain a constant signal amplitude.

Figure 5A:
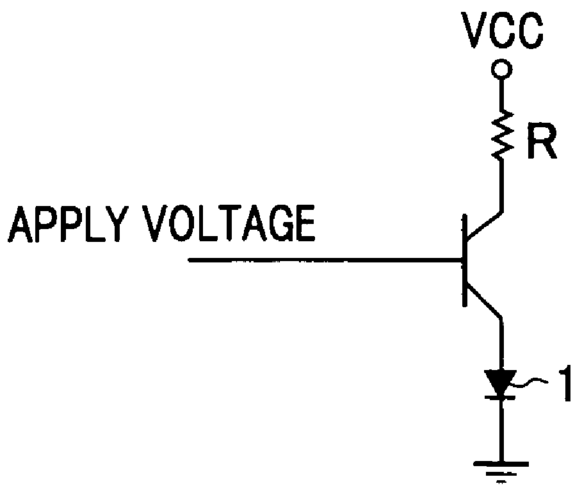
FIGS. 5A and 5B illustrate the structures of amount-of-light controlling circuits.
Figure 5B:
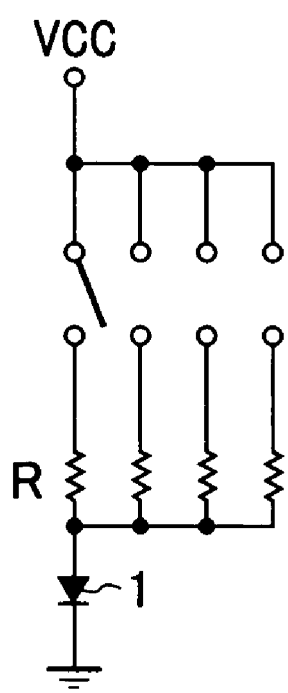

FIGS. 5A and 5B show circuits for controlling the amount of light emitted from the light-emitting device 1. FIG. 5A shows a circuit for applying the control voltage obtained in the CPU 17 or the like to the base of a transistor to control the amount of light emitted from the light-emitting device 1 based on the control voltage.

FIG. 5B shows a circuit for switching a limiting resistor R of the light-emitting device 1 based on a control signal obtained in the CPU 17 or the like. Although this circuit disadvantageously performs the stepwise switching, it is possible to control the light-emitting device 1 at a low cost.

Figure 6:
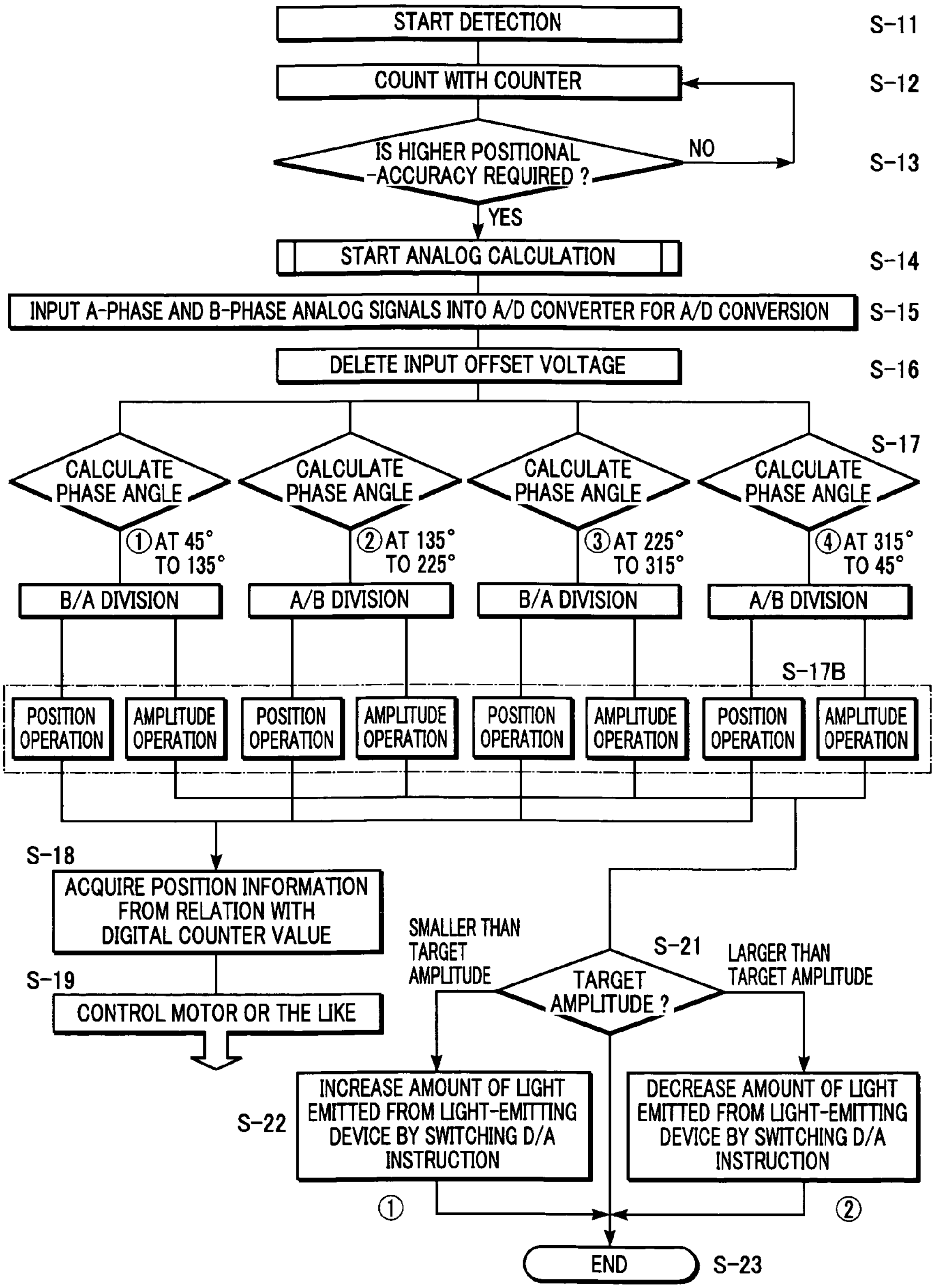
FIG. 6 is a flowchart showing a process in an optical encoder according to a second embodiment of the present invention.

FIG. 6 is a flowchart of a process in the optical encoder 4 according to a second embodiment of the present invention. Although the same circuit as in FIG. 2 is used, the process in FIG. 6 differs from the process in FIG. 3 in the arithmetic processing after the analog signals are converted into the digital signals, which are supplied to the CPU 17. Steps from S-11 to S-16 are the same as Steps from S-1 to S-6 shown in FIG. 3.

In Step S-17, the process divides the A-phase signal by the B-phase signal or divides the B-phase signal by the A-phase signal in accordance with the relation between the A-phase signal and the B-phase signal. In Step S-17B, the process compares the division result with data in a data table to perform a position operation and an amplitude operation. In the amplitude operation here, the process determines an A-phase voltage or a B-phase voltage corresponding to a predetermined reference amplitude from the division result and compares the determined A-phase voltage or B-phase voltage with the actual A-phase voltage or B-phase voltage to obtain the amplitude. In other words, the process obtains the amplitude based on the A-phase voltage (A-phase voltage in the reference amplitude, acquired from the division and the data table) or the B-phase voltage (B-phase voltage in the reference amplitude, acquired from the division and the data table). In the position operation, in Steps S-18 and S-19, the process acquires the detailed position information from the relation with digital counter values in a motor-controlling routine, and drives and controls an actuator such as a motor, as in the process shown in FIG. 3.

In Steps S-21 and S-22, the process controls the amount of light emitted from the light-emitting device 1 in accordance with the obtained amplitude so as to provide a constant amplitude. Since the table data is used after the division, it is sufficient to use the data table including the ratio of the A-phase signal to the B-phase signal, thus reducing the number of data tables.

Although the amplitude is calculated by using the data table, the position information can also be calculated by using the data table.

Figure 7:
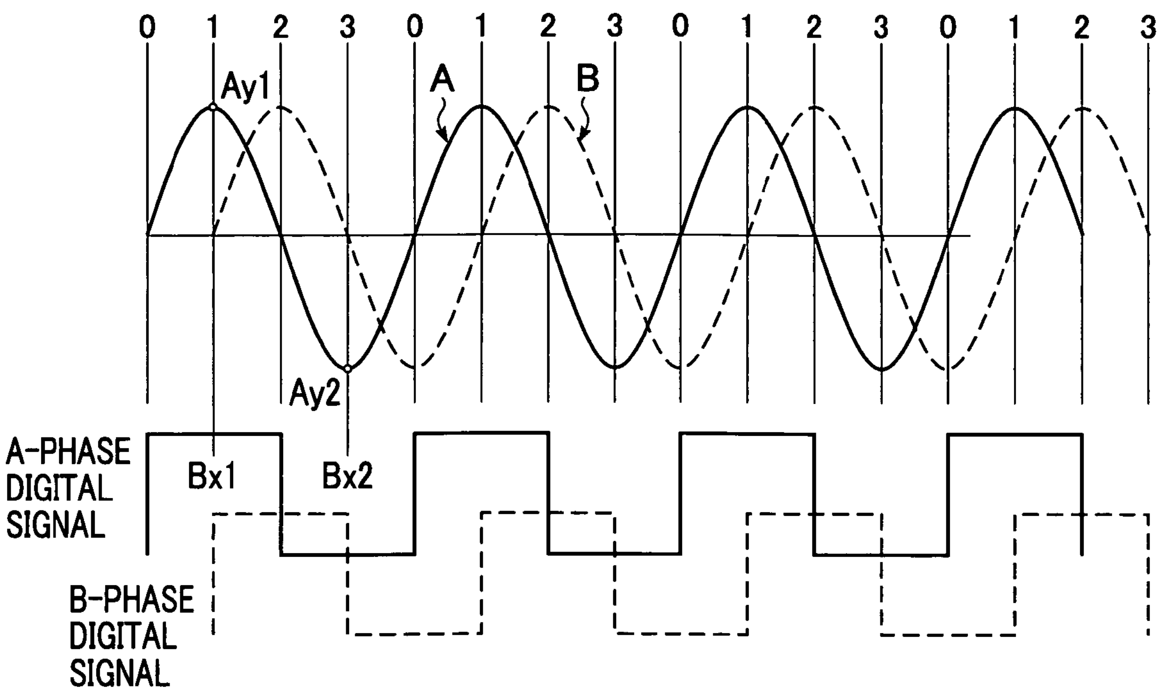
FIG. 7 illustrates signal processing according to a third embodiment of the present invention.

FIG. 7 illustrates signal processing according to a third embodiment of the present invention. While the position information is calculated based on the division result of the A-phase signal by the B-phase signal or the division result of the B-phase signal by the A-phase signal to determine the amplitude in the first and second embodiments shown in FIGS. 3 and 6, the value of the A-phase signal when the B-phase signal crosses zero is detected as an A-phase amplitude in the third embodiment because the phase difference between the A-phase signal and the B-phase signal is 90°. Similarly, the value of the B-phase signal when the A-phase signal crosses zero is detected as a B-phase amplitude.

In other words, referring to FIG. 7, the A-phase signal reaches a maximum displacement point Ay1 at a point Bx1 where the B-phase signal moves from the minus side to the plus side with respect to the signal center. Contrarily, the A-phase signal reaches a minimum displacement point Ay2 at a point Bx2 where the B-phase signal moves from the plus side to the minus side with respect to the signal center. The difference between the displacement point Ay1 and the displacement point Ay2 is the amplitude.

In known amplitude-detecting methods, the maximum value and the minimum value are calculated to determine the amplitude after the analog signals are captured at short intervals and one cycle of the analog signal is sampled. In contrast, it is sufficient to measure the amplitude at two points in the third embodiment, thus eliminating the need for operating the analog-to-digital converters 18_a_ and 18_b_ at high speed and reducing the number of pieces of data to be sampled.

Although the amplitude is detected from the two points, that is, the maximum displacement point and the minimum displacement point in the above description, doubling the absolute value of the displacement at a point where the analog signal crosses zero can provide the signal amplitude in view of the fact that the analog signal provided by the encoder is an uncorrupted sinusoidal wave and, therefore, is a vertically symmetrical wave. Doubling the absolute value of the displacement at two points where the A-phase signal crosses zero and where the B-phase signal (S2–S4) crosses zero can provide the amplitude at the quarter timing of one cycle of the analog signal.

Figure 8:
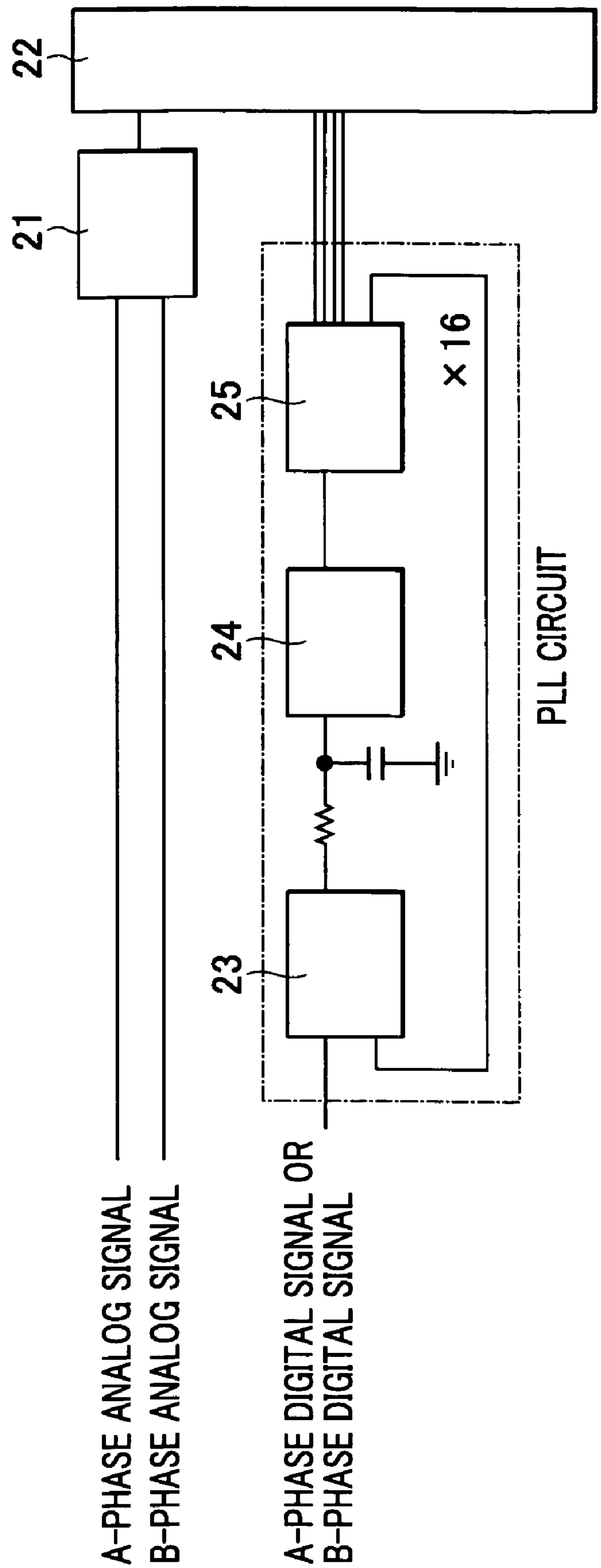
FIG. 8 is a block diagram showing the structure of a signal processing circuit according to a fourth embodiment of the present invention.

FIG. 8 is a block diagram of a signal processing circuit according to a fourth embodiment of the present invention. An A-phase analog signal and a B-phase analog signal are supplied to a CPU 22, such as a microcomputer, through an analog-to-digital converter 21. An A-phase digital signal or a B-phase digital signal is supplied to the CPU 22 through a phase locked loop (PLL) circuit including a phase comparator 23, a voltage controlled oscillator (VCO) circuit 24 that oscillates at 16× frequency, and a counter circuit 25.

Figure 9:
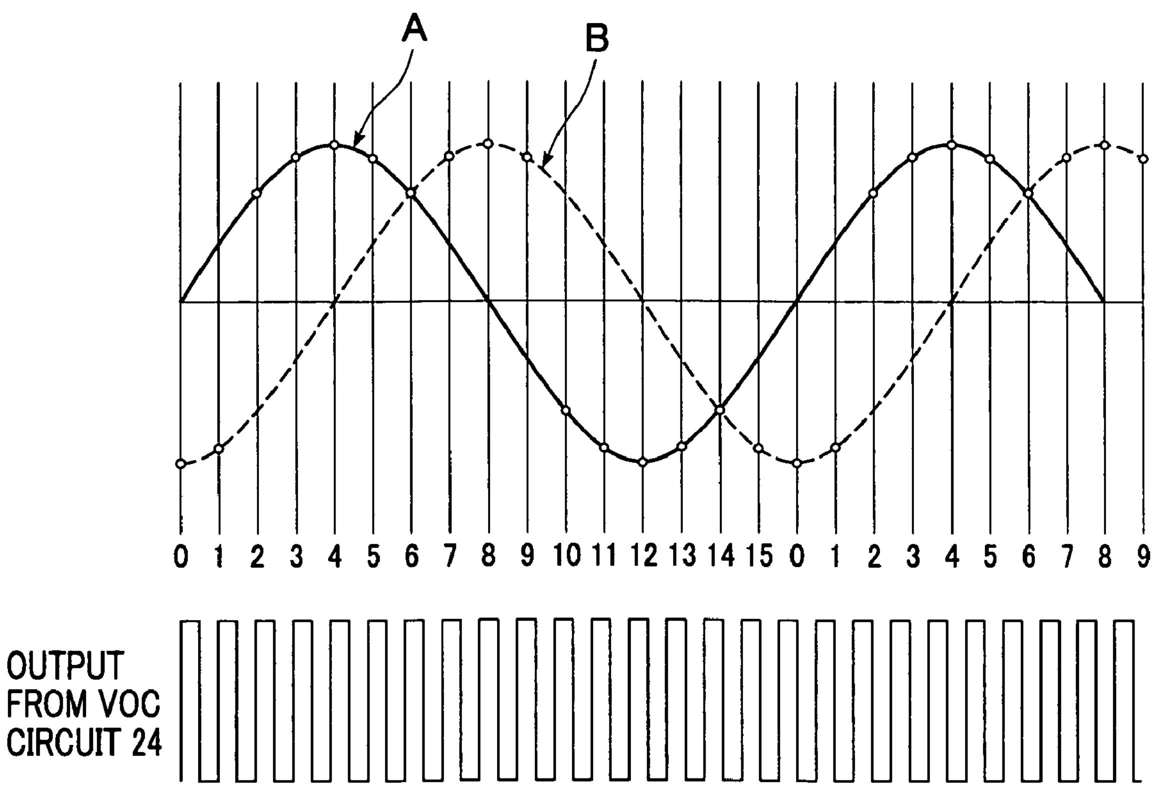
FIG. 9 illustrates signal processing according to the fourth embodiment of the present invention.

In the PLL circuit, the signal frequency provided by the encoder is changed to 16× frequency for counting. As shown in FIG. 9, the analog signal is converted into the digital signal by the analog-to-digital converter 21 at a timing when the counted value is switched, and the converted digital signal is supplied to the CPU 22. The counter circuit 25 counts pulses whose frequency is changed to 16× frequency by the VCO circuit 24 with respect to, for example, the rising edge of the A-phase signal. The values counted by the counter circuit 25 return to zero in one cycle.

Detecting the analog signal at the point where the A-phase signal crosses zero or where the B-phase signal crosses zero, that is, at the pulse edge of the digital signal enables the detection of the amplitude at the quarter timing of one cycle of the analog signal in the third embodiment described above. In contrast, changing the frequency of the digital signal to a higher frequency by using the PLL circuit and multiplying the higher frequency by a conversion coefficient corresponding to the counted value of the digital signal enables the detection of the amplitude at shorter intervals in the fourth embodiment.

Performing the operation as shown in Table 1 for the signal that has the relation shown in FIG. 9 and is captured in the circuit structure in FIG. 8 gives a value corresponding to the amplitude. The absolute values are shown in Table 1.

TABLE 1

| Counted Value | Operation |
|---|---|
| 0 | 1 × B |
| 1 | 1.0824 × B |
| 2 | 1.4142 × A |
| 3 | 1.0824 × A |
| 4 | 1 × A |
| 5 | 1.0824 × A |
| 6 | 1.4142 × B |
| 7 | 1.0824 × B |
| 8 | 1 × B |
| 9 | 1.0824 × B |
| 10 | 1.4142 × A |
| 11 | 1.0824 × A |
| 12 | 1 × A |
| 13 | 1.0824 × A |
| 14 | 1.4142 × B |
| 15 | 1.0824 × B |

Since the process in the counter circuit 25 loops such that the counted values are cleared for every sixteen pulses output from the VCO circuit 24, it is sufficient to store sixteen kinds of arithmetic expressions.

Referring to Table 1, the same operations are performed for the counted values 0 to 7 in the left column and the counted values 8 to 15 in the right column. In other words, the amplitude can be calculated by using octal numbers, instead of hexadecimal numbers and, therefore, it is sufficient to store eight kinds of arithmetic expressions.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical encoder comprising:

a light-receiving device including a plurality of light-receiving portions configured to generate a pair of signals each having a different phase;

a scale including an optical grating formed thereon, wherein the scale is movable relative to the light-receiving device;

a light-emitting device applying light to the plurality of light-receiving portions via the scale;

a detecting unit detecting position information in one cycle of the signals; and a determining unit determining a first value in accordance with the position information, and determining an amplitude of the signals based on the first value.

2. An optical encoder according to claim 1, wherein the detecting unit detects the position information in one cycle of the pair of signals based on a division result of the pair of signals.

3. An optical encoder according to claim 1, further comprising a control unit controlling light emission intensity of the light-emitting device so as to provide a predetermined amplitude.

4. An optical encoder according to claim 1, wherein the determining unit determines the first value by calculating an amplitude of either of the pair of signals based on the position information, and determines the amplitude of the signals by comparing the first value with a unit amplitude.

5. An optical encoder according to claim 2, wherein the determining unit determines the first value by determining a voltage of either of the pair of signals that corresponds to a predetermined reference amplitude hosed on the division result, and determines the amplitude of the signals by comparing the voltage with an actual voltage of the signals.

6. A method of controlling an optical encoder including a light-receiving device having a plurality of light-receiving portions; a scale including an optical grating formed thereon, wherein the scale is movable relative to the light-receiving device; and a light-emitting device, the method comprising the steps:

controlling the light-emitting device to apply light to the plurality of light-receiving portions via the scale;

supplying a analog pair of signals having different phases with each other via the light-receiving device;

detecting position information in one cycle of the signals; and determining a first value in accordance with the position information and determining an amplitude of the signals basal on the first value.

7. A method according to claim 6, wherein the detecting step includes the steps of:

dividing the pair of signals; and detecting the position information in one cycle of the pair of signals based on the divided signals.

8. A method according to claim 6, further comprising a step of controlling light emission intensity of the light-emitting devices so us to provide a predetermined amplitude.

9. A method according to claim 6, wherein the step of determining the first value includes calculating an amplitude of either of the pair of signals based on the position information, and wherein the step of determining the amplitude of the signals includes comparing the first value with a unit amplitude.

10. A method according to claim 7, wherein the step of determining the first value includes determining a voltage of either of the pair of signals that corresponds to a predetermined reference amplitude based on the divided pair of signals, and wherein the step of determining the amplitude of the signals includes comparing the voltage with an actual voltage of the signals.

11. An optical encoder comprising:

a light-receiving device including a plurality of light-receiving portions configured to generate first and second signals having different phases with each other, a scale including an optical grating formed thereon and being movable relative to the light-receiving device;

a light-emitting device configured to emit light to the plurality of light-receiving portions via the scale;

a detection unit configured to detect amplitude information of the second signal; and a determination unit configured to determine an amplitude of the first and second signals based on a first value of the first signal when the detected amplitude information of the second signal reaches a second value.

12. An optical encoder according to claim 11, wherein the second value is zero.

13. An optical encoder according to claim 12, wherein the first value of the first signal is maximum and minimum displacement points of the first signal, and wherein the determination unit determines the amplitude of the first and second signals by calculating a difference between the maximum and minimum displacement points.

14. An optical encoder according to claim 12, wherein the determination unit determines the amplitude of the first and second signals by doubling the first value of the first value.

* * * * *

UNITED STATES PATENT AND TRADEMARK OFFICE

CERTIFICATE OF CORRECTION

PATENT NO. : 7,019,282 B2
APPLICATION NO. : 10/863886
DATED : March 28, 2006
INVENTOR(S) : Akio Atsuta and Masahiko Igaki It is certified that error appears in the above-identified patent and that said Letters Patent is hereby corrected as shown below:

Column 8:
CLAIM 5

Line 35, “hosed” should read “based”

Column 8
CLAIM 6

Line 46, “analog” should be deleted

Col. 8:
CLAIM 6

Line 52, “basal” should read “based”

Column 8:
CLAIM 8

Line 60, “us” should read “as”

Signed and Sealed this

Fifteenth Day of August, 2006

JON W. DUDAS
*Director of the United States Patent and Trademark Office*